July 21, 1964  L. J. DREYLING ETAL  3,141,781
PRODUCTION OF LIGHT WEIGHT HIGH TEMPERATURE REFRACTORY PRODUCTS
Filed May 6, 1960
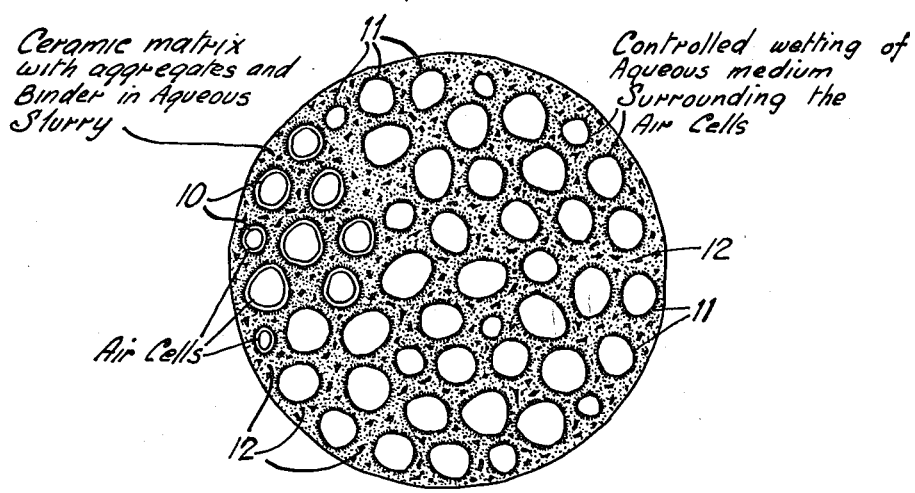
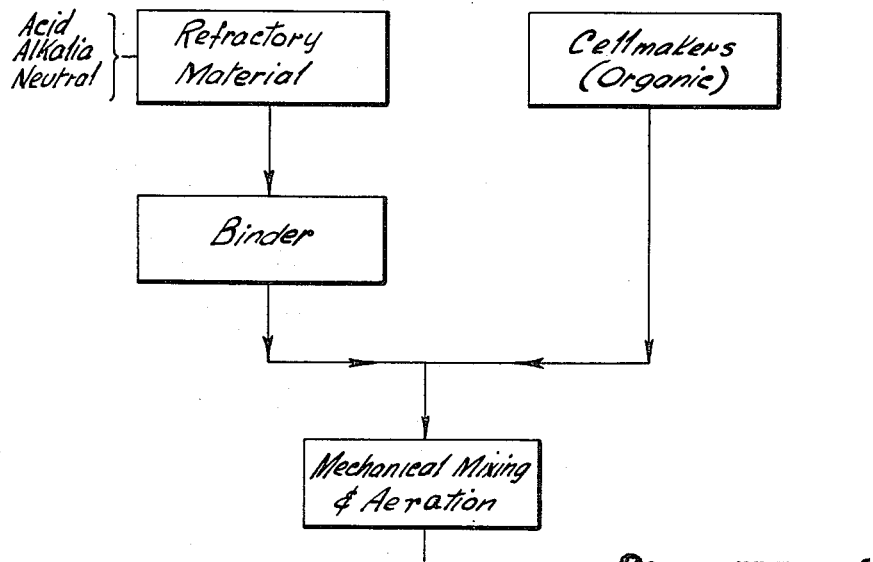

United States Patent Office 3,141,781
Patented July 21, 1964

3,141,781
PRODUCTION OF LIGHT WEIGHT HIGH TEMPERATURE REFRACTORY PRODUCTS
Lewis J. Dreyling, East Brunswick, and Alfred P. Dreyling, South River, N.J., assignors to Quigley Company, Inc., a corporation of New York
Filed May 6, 1960, Ser. No. 27,366
2 Claims. (Cl. 106—41)

This invention relates to the method of producing light weight refractories or light weight castable products capable of resisting high temperatures and having low shrinkage factors.

The trouble encountered in the past has been the inability to use an air dispersing agent that will produce an even dispersion of air throughout the mix. It is this inability to produce the even dispersion of air cells in the mix which affects the insulating properties of said mix, in that the insulating properties are lost since there is more or less freedom in air passage through the ceramic mass due to the character of the voids developed. This loss of insulating properties is due mainly to the cells as such fusing one into the other. The high insulating properties are due therefore to high even air dispersion resulting in low actual porosity and this is only possible by the presence of dead air in the form of discrete and individual spherical cells.

The normal air dispersing or foaming agents now used are essentially alkaline soaps which tend to reduce interfacial and surface tension of an aqueous vehicle, thereby causing the envelopment of air as bubbles. The reduction of interfacial tension causes wetting and penetration of the aqueous vehicle (water) into the refractory ingredients, a feature which is detrimental in the preparation and manufacture of refractory products.

It has been with this background in mind that the instant invention was conceived to solve the problem of the envelopment or entrainment of air in the form of individual spherical bubbles resulting in high even air dispersion in the form of discrete and individual cells which when fired become dead air cells. The approach to the problem was along a new path, in that the development of the entrained or entrapped air bubbles is done by the combination of a wetting agent and an added ingredient to control absorption and thus prevent the penetration of the water and wetting agent into the refractory material. The result was to reduce surface tension and yet prevent excessive absorption and penetration of the solution into the refractory material surrounding the bubbles.

The solution of the problem was through the development of organic air cell forming and sustaining compounds which may be prepared in the form of a liquid. Said organic compounds are designed to function equally well in neutral, acid or alkaline mineral compositions normally used to manufacture refractory products. The organic compounds are mixed with the normal refractory filler materials and will cause air to be entrapped uniformly and sustained throughout the mass when mixed in a conventional mechanical mixer. The degree of air dispersion is governed by the percentage and composition of the organic compounds used and the length of time of mixing employed. The volume of the mix when suitably mixed in a conventional mixer can be brought up to 3, 4, 5 or even more times the volume of the original slurry started with, and so give controlled air dispersion and volume of mix and thereby control density, insulating values and weight. The organic air cell forming and sustaining compounds are highly volatile and thus disappear without appreciable residue on firing.

In the accompanying drawings:

FIG. 1 is a magnified view of the surface of a light weight refractory product; and FIG. 2 is a flow diagram used in the making of refractory products.

The organic air cell forming and sustaining compounds include a wetting agent which has controlled wetting power, but said wetting power is controlled by the presence of an absorption control agent which, in addition to being a sustaining agent, acts to control the penetration of the water and wetting agent into the refractory material and thus control and insure the entrapment of air upon agitation. In the following disclosures the organic air cell forming and sustaining compounds will be called "cellmakers" for the sake of brevity and clarity.

CELLMAKER A

| | Percent |
|---|---|
| Duponol WAT | 40 |
| La 90 | 20 |
| Water | 40 |
| Total | 100 |

*Notes:*—Duponol WAT is an alkylolamine salt of long chain alcohol sulfate. La 90 is lauric diethanolamine.

This cellmaker is designed specifically for alkaline systems.

Cellmaker A may be used for certain end products in which the binder materials are of a certain category and of a given grain size to result in the formation of large size separate and discrete individual air cells. Where it is desired to entrain and form a multitude of smaller size separate and discrete individual air cells a small amount of methyl cellulose may be added as shown in the following Example No. 1.

In the making of refractory compositions for refractory products based on aluminas or calcined kyanites bound with calcium aluminate cement, cellmaker A will directly cause air to be evenly dispersed and sustained throughout the mass when mixed in a conventional paddle mixer. The degree of air dispersion with consequential density and insulating value control is governed entirely by the percentage of the cellmaker used in the preparation of the mix and the length of time employed in the mixing thereof. The resulting air dispersed mixture may be poured into molds and allowed to set up without the destruction of the air cells. The cellmarker A itself can be changed to meet varying conditions by varying the percentages of Duponol Wat and the La 90. The Du Pont Wat relieves the surface tension while the La 90 reduces the absorption or penetration of the Duponol Wat. The end result of the cellmaker is to act as a controlled wetting agent.

A good example of a mineral composition suitable for making a light weight refractory product and which will yield a product that will resist heat to 3000° F. and weigh approximately 33 lbs. per cu. ft. is as follows:

*Example I*

| | Percent |
|---|---|
| Alumina $A_2$ | 35 |
| Alumina $A_3$ | 21 |
| New Alcoa cement | 12.9 |
| Bentonite | 2.0 |
| Cellmaker A | 0.8 |
| Methyl cellulose | 0.3 |
| Water | 28.0 |
| Total | 100 |

The constituents of Example I will now be explored:

The Alumina $A_2$ and $A_3$ are basic refractories and good for 4000° F., while the New Alcoa Cement which forms the binder is good for from 2900° to 3000° F. The action of the bentonite is as a fluxing agent and it is good for 2500° to 2600° F. The foregoing group represents the permanent solids in the above cited composition.

The cellmaker A which is the controlled wetting agent, and which in conjunction with methyl cellulose also form the sustaining agents for the air cells, is entirely organic and so will disappear on firing. The mass is placed in a conventional paddle type mixer and agitated until a predetermined volume is reached which will result in the density desired in the end product. The end result is therefore attained by the progressive foam produced and the spherical structure of the individual air cells which are maintained by the presence of methyl cellulose. Compositions of this type prepared into refractory products have great insulating properties.

The main idea in developing light weight refractory products is to employ aggregates that are resistant to temperatures above those for which the ultimate product is intended. In the absence of available extremely light weight aggregates resistant to temperatures of from 2500° to 3000° F., it has been necessary to develop an intermediate aggregate weighing more than the intended product in order to compensate for the excessive weight of the binder and other materials essential to yield the desired product.

It is now possible to refer to FIG. 1 in which has been reproduced an enlarged view of the face of a light weight refractory product made by the use of the cellmakers described herein. The air cells 10 are completely surrounded by the continuous film 11 of the air cell producing agent with the controlled wetting and penetration and which in addition sustains the air cells when dispersed in ceramic slurries. The remaining areas between the air cells 10 with their film 11 therearound contain the ceramic matrix with suitable aggregates and binders in an aqueous slurry.

In FIG. 2 is shown a flow diagram employed in making refractory products.

The refractory products that can be made as a result of this invention are all in the light weight category and run from 25 to 100 lbs. per cubic foot and will resist temperatures above 2500° F. without undergoing excessive distortion or shrinkage depending on the refractory materials employed. It is evident therefor that the invention disclosed herein is a distinct and new approach in the art of refractories.

In the use of an organic air cell forming and sustaining compound for the production of refractory products, it is proposed to thoroughly mix the organic compound with water and then thoroughly disperse the solution throughout the remaining dry refractory mass, the composition thus being completely mixed in slurry form ready for aeration, molding and firing. This preliminary mixing is desirable because of the small percentage of the cellmaker employed and insures a uniform dispersion of the discrete and individual dead air cells which are later produced during the slurrying and aerating operation. Moreover, the preliminary mix of the organic air cell forming and sustaining compound could be supplied as a commercial composition.

What is claimed is:

1. A process for the production of light weight refractory products, comprising the steps of mixing a refractory material with water and an organic air cell forming and sustaining compound to produce an aqueous slurry, agitating said slurry for a sufficient period of time to create a multitude of separate and discrete air cells uniformly distributed throughout the mixture for a desired increase in volume, said organic air cell forming and sustaining compound including a wetting agent mixed with water which controls the formation and distribution of the multitude of separate and discrete air cells and an absorption-control agent which prevents the penetration of the water and the wetting agent therein into the refractory material, and then converting the mixture by forming and firing into end products free of contamination by driving off the organic air cell forming and sustaining compound during firing, characterized in that the organic air cell forming and sustaining compound is mixed with alkaline refractory materials and consists of 40% by weight of alkylolamine salt of long chain alcohol sulfate and 20% by weight of lauric diethanolamine mixed with 40% by weight of water.

2. A process for the production of light weight refractory products according to claim 1 wherein the organic air cell forming and sustaining compound comprises approximately 0.8% by weight of the total mixture before firing.

References Cited in the file of this patent

UNITED STATES PATENTS

| | | |
|---|---|---|
| 1,641,641 | Nelson | Sept. 6, 1927 |
| 1,896,190 | Smith et al. | Feb. 7, 1933 |
| 1,963,030 | Powell | June 12, 1934 |
| 2,191,555 | Berliner | Feb. 27, 1940 |
| 2,913,346 | Hoffman | Nov. 17, 1959 |
| 3,052,949 | Williams et al. | Sept. 11, 1962 |

FOREIGN PATENTS

| | | |
|---|---|---|
| 463,949 | France | Dec. 31, 1913 |
| 315,205 | Great Britain | July 5, 1929 |
| 539,022 | Great Britain | Aug. 25, 1941 |
| 125,329 | Australia | Sept. 3, 1947 |
| 612,996 | Great Britain | Nov. 19, 1948 |
| 633,114 | Great Britain | Dec. 12, 1949 |
| 648,299 | Great Britain | Jan. 3, 1951 |
| 663,568 | Great Britain | Dec. 27, 1951 |
| 145,394 | Australia | Feb. 25, 1952 |
| 167,243 | Australia | Mar. 15, 1956 |

OTHER REFERENCES

Schwartz et al.: "Surface Active Agents," vol. II, pub. 1958 by Interscience Pub., New York (pages 458–464).

UNITED STATES PATENT OFFICE
CERTIFICATE OF CORRECTION

Patent No. 3,141,781                                    July 21, 1964

Lewis J. Dreyling et al.

It is hereby certified that error appears in the above numbered patent requiring correction and that the said Letters Patent should read as corrected below.

Column 2, line 45, for "Du Pont" read -- Duponol --.

Signed and sealed this 17th day of November 1964.

(SEAL)
Attest:

ERNEST W. SWIDER                               EDWARD J. BRENNER
Attesting Officer                                     Commissioner of Patents